United States Patent
Sacco et al.

(10) Patent No.: US 12,103,448 B2
(45) Date of Patent: Oct. 1, 2024

(54) TRIM RETENTION MEMBER

(71) Applicant: LEAR CORPORATION, Southfield, MI (US)

(72) Inventors: Jason Sacco, West Bloomfield, MI (US); Laura Schulz, Bloomfield Hills, MI (US); Ronald L. Miotto, Canton, MI (US)

(73) Assignee: LEAR CORPORATION, Southfield, MI (US)

( * ) Notice: Subject to any disclaimer, the term of this patent is extended or adjusted under 35 U.S.C. 154(b) by 340 days.

(21) Appl. No.: 17/749,935

(22) Filed: May 20, 2022

(65) Prior Publication Data

US 2022/0379784 A1 Dec. 1, 2022

Related U.S. Application Data

(60) Provisional application No. 63/194,690, filed on May 28, 2021.

(51) Int. Cl.
*B60N 2/58* (2006.01)
*B60N 2/20* (2006.01)
*B60R 13/02* (2006.01)

(52) U.S. Cl.
CPC .............. *B60N 2/5816* (2013.01); *B60N 2/20* (2013.01); *B60N 2/5825* (2013.01); *B60R 13/02* (2013.01)

(58) Field of Classification Search
CPC ...... B60N 2/20; B60N 2/5816; B60N 2/5825; B60R 13/02
See application file for complete search history.

(56) References Cited

U.S. PATENT DOCUMENTS 5,799,970 A * 9/1998 Enders ................ B60R 21/2171
280/730.2
7,879,425 B2 2/2011 Schulte et al.
(Continued)

FOREIGN PATENT DOCUMENTS

CN 101505994 A 8/2009
CN 204736732 U 11/2015
(Continued)

OTHER PUBLICATIONS

DE Office Action for DE Application No. 10 2022 113 437.7 dated Aug. 1, 2023, and Machine Translation, 5 pages.
(Continued)

*Primary Examiner* — Syed A Islam
(74) *Attorney, Agent, or Firm* — Brooks Kushman P.C.

(57) ABSTRACT

A trim cover assembly includes a trim cover disposable over a cushion having a release handle bezel assembly, the trim cover has an A-side and a B-side, opposite the A-side, facing an external surface of the cushion. The trim cover defines a cover opening that, when disposed over the cushion, generally corresponds to a release handle of the release handle bezel assembly. The trim cover assembly also includes a trim retainer on the B-side of the trim cover having an outer periphery and an inner periphery defining a retainer opening generally corresponding to at least a portion of the cover opening. The trim retainer is configured to engage a housing of the release handle bezel assembly such that the trim cover assembly can be secured to the housing and between the housing and a bezel of the release handle bezel assembly.

20 Claims, 4 Drawing Sheets

(56) References Cited

U.S. PATENT DOCUMENTS

| | | | | |
|---|---|---|---|---|
| 9,061,647 | B2* | 6/2015 | Steinbrecher | B60R 21/215 |
| 9,649,964 | B2* | 5/2017 | Imajo | B60N 2/5816 |
| 11,654,805 | B2* | 5/2023 | Yang | B60N 2/5883 |
| | | | | 297/218.1 |
| 2019/0023157 | A1* | 1/2019 | Widhopf | B60N 2/22 |

FOREIGN PATENT DOCUMENTS

| | | |
|---|---|---|
| CN | 107406021 A | 11/2017 |
| CN | 208827645 U | 5/2019 |
| DE | 10 2006 058 388 A1 | 2/2008 |
| DE | 10 2011 086 323 A1 | 5/2013 |
| EP | 1 352 779 A1 | 10/2003 |
| JP | 2007-055505 A | 3/2007 |
| JP | 2007-131199 A | 5/2007 |
| JP | 2008-0189771 A | 1/2008 |
| JP | 2011-68200 A | 4/2011 |
| JP | 2013-203090 A | 10/2013 |
| JP | 2017-128246 A | 7/2017 |
| WO | 2013/135871 A1 | 9/2013 |

OTHER PUBLICATIONS

CN Office Action for CN Application No. 2022105992421 dated Jul. 25, 2023, and Machine Translation, 19 pages.
Chinese Office Action for CN App. No. 2022105992421, dated Mar. 28, 2024 and English Translation, 17 pages.

* cited by examiner

TRIM RETENTION MEMBER

CROSS-REFERENCE TO RELATED APPLICATIONS

This application claims the benefit of U.S. provisional application Ser. No. 63/194,690 filed May 28, 2021, the disclosure of which is hereby incorporated in its entirety by reference herein.

TECHNICAL FIELD

The present application is directed to a seat assembly, and more particularly, a seat assembly with a trim retention member included in a trim cover assembly.

BACKGROUND

Vehicle seats having seat bottoms and seatbacks typically include foam cushions disposed on a seat frame to provide support to vehicle occupants. The cushions include a trim cover disposed thereon to provide an aesthetically pleasing appearance for the occupant support surface. The seats may include various fixtures for attaching trim covers to the seat frame, and the trim cover may include particular geometries to form design elements in the occupant support surface or receive components of the seat therethrough.

SUMMARY

According to one or more embodiments, a trim cover assembly includes a trim cover defining a cover opening for accessing a handle therethrough when the trim cover assembly is covering a seat. The trim cover assembly also includes a trim retention member on the B-side of the trim cover with a retention opening positioned to correspond with the cover opening. The trim cover assembly is configured to be disposed on a housing of a release handle bezel assembly, with the trim retention member engaging fastening elements on the housing. One of the trim retention member and the housing include protrusions, and the other includes corresponding apertures, or each includes a combination of apertures and protrusions, which engage to secure the trim cover assembly on the housing. The bezel is then placed thereon to sandwich the trim cover assembly between the housing and the bezel, with the trim retention member improving the finish and closeout appearance of the trim cover around the release handle bezel assembly. A method for securing the trim cover assembly to a release handle bezel assembly is also provided.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to one or more embodiments, a seat assembly includes a release handle bezel assembly cooperable with a trim cover assembly for covering the seat cushions. The trim cover assembly is disposed on the housing of the release handle bezel assembly to provide an aesthetically desired look for the seat around the release handle while providing and access to the release handle. The trim cover assembly includes a trim cover defining a cover opening for accessing the release handle and receiving a bezel therethrough when the trim cover assembly is covering a seat including the release handle bezel assembly. The trim cover assembly also includes a trim retention member on the B-side of the trim cover. The size and shape of the trim retention member and a retention member opening is selected based on the positioning of the release handle bezel assembly in the seat such that the cover opening and retention member opening generally correspond to at least a portion of each other, and a at least a portion of the handle housing to provide access to the handle of the release handle bezel assembly. In the embodiments described in the Figures, the trim cover opening and the trim retention member are generally U-shaped, such that the defined perimeter of the trim cover opening and the retainer opening does not have a full periphery (i.e., has an open geometry), however other shapes and openings are also contemplated. The trim retention member and/or housing include features that allow the trim retention member and housing to be engaged to better secure the trim cover assembly to the housing. The trim retention member thus helps secure the trim cover assembly on the handle housing such that wrinkling in the trim cover around the release handle bezel assembly is reduced and the trim cover is better held on the handle housing without compromising the aesthetic look of the trim cover near the release handle bezel assembly.

Figure 1:
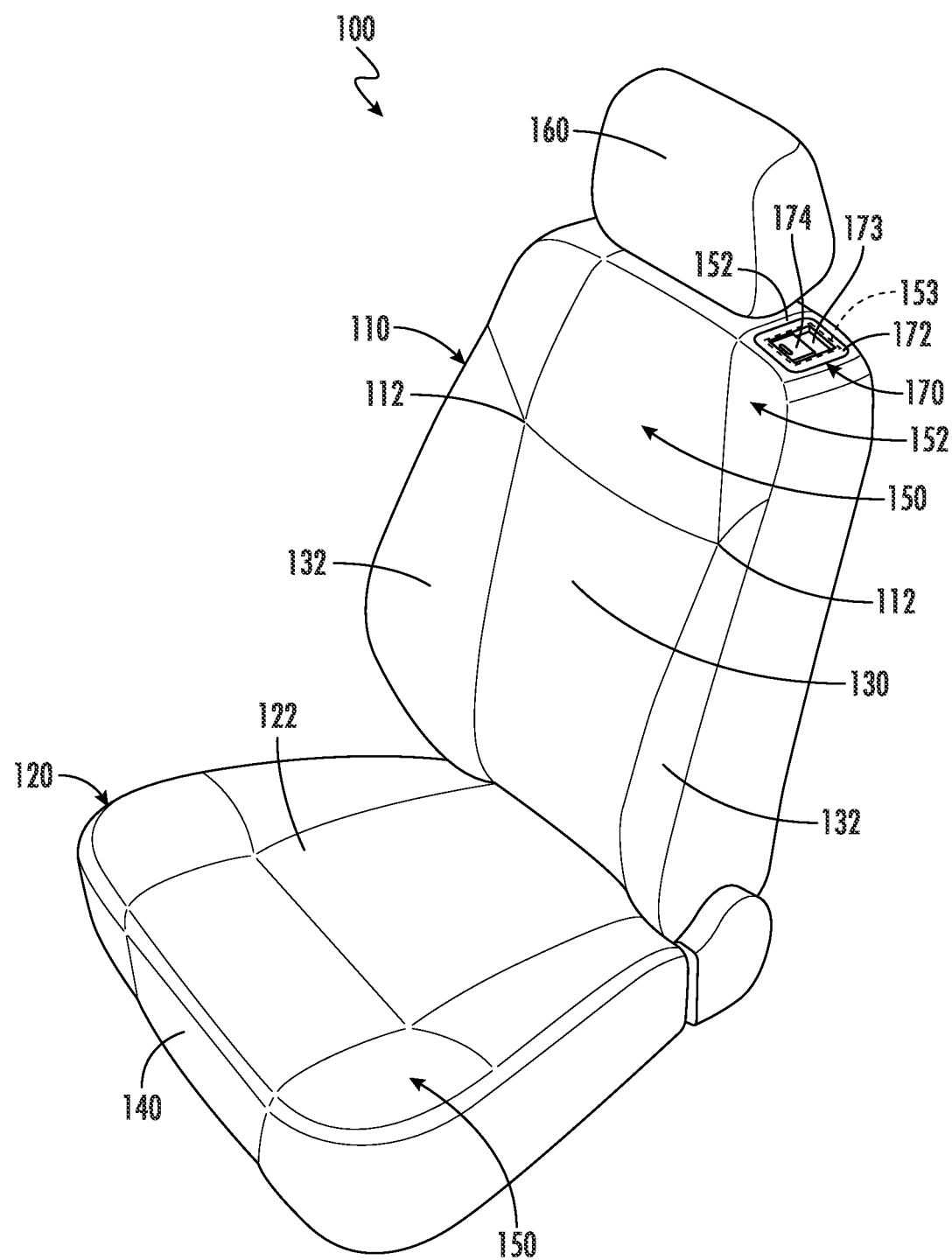
FIG. 1 is a perspective schematic illustration of a representative vehicle seat, according to at least one embodiment.

Referring now to the figures, where like numerals are used to designate like structure throughout to the drawings, a schematic vehicle seat assembly in accordance with at least one embodiment of the present disclosure is generally shown at by seat assembly 100 in FIG. 1.

FIG. 1 illustrates a schematic view of a seat assembly 100. The seat assembly 100 may be adapted for use in a motor vehicle, such as a car or truck, or may be used in with other seat assemblies including in aircraft, theater seats or any suitable seat assemblies, and the discussion of the seat assembly 100 in a vehicle is not intended to be limiting. While the seat assembly 100 is illustrated in FIG. 1 to be a bucket seat assembly, it should be understood that the principles of the present disclosure are applicable to other types of seat assemblies, such as bench, captain, and other types of seat assemblies.

As shown in FIG. 1, the vehicle seat assembly 100 includes a seatback 110 and a seat bottom 120, connected to form seat assembly 100 for supporting an occupant in the vehicle. The seatback 110 may be pivotally mounted to seat bottom 120. The seat bottom 120 may be mounted on a seat frame (not shown) which can be removably secured to the vehicle floor. In some embodiments, the seatback 110 may include a head restraint 160.

In at least one embodiment, each of the seatback 110 and seat bottom 120 include foam cushion 130, 140, respectively. The foam cushion 130, 140 can be conventionally secured to a seat frame (not shown) by any method generally known in the art. Each foam cushion 130, 140 may be one or more foam parts, joined together to form the seat component. For example, the seatback 110 foam cushion 130 may include side bolster portions 132, or any other components to meet a desired design. The foam cushions 130, 140 can have any suitable size and be formed from any suitable configuration of components. The seatback foam cushion 130 and the seat bottom foam cushion 140 can independently comprise any suitable comfort foam material such as, but not limited to, a suitable resilient polymer, and can independently be formed in any suitable manner. For example, the foam cushions 130, 140 may be formed of conventional polyurethane foam, soy-based foam, silicone, thermoplastic olefins, thermoplastic urethanes, and/or natural oil-based expanded polyurethanes, soy-based polyurethane, polymer fibers, non-woven polyester pads, latex foams and the like. The foam cushions 130, 140 are formed of any suitable comfort material that provides soft resilience as the seat assembly is deflected during use when an occupant is in a seated position. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574.

The seat assembly 100 also includes trim cover assembly 150 adapted to engage the foam cushions 130, 140 in a covering relationship. The trim cover assembly 150 may be secured to the foam cushions 130, 140 in any suitable manner, such as, but not limited to, by mechanical fasteners or heat forming. The trim cover assembly 150 includes a trim cover 152, which may comprise any material commonly known in the art. By way of example, some of the known materials include cloth, fabric, leather, synthetic leather, vinyl, synthetic suede, non-woven fabric, or combinations thereof (fabric-to-fabric, leather-to-leather, fabric-to-leather, leather-to-fabric, etc.), or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as layers of the trim cover 152 may include a foam backing (not shown, but generally known in the art) which may be manufactured from a variety of polymer foam materials. By way of example, the foam backing may be polyethylene, polypropylene, polyurethane, or a polystyrene foam. Optionally, other layers such as a mesh or reinforcing material (not shown, but generally known in the art) such as fiberglass or nylon may be applied to the foam backing or back of the trim cover 152 for increasing strength without increasing rigidity. The trim cover assembly 150 provides an occupant seating surface 112, 122 for the seatback 110, and seat bottom 120, respectively. The occupant seating surface 112, 122 is formed on the A-side of the seat assembly 100, which is the external surface visible to the occupant. It should be understood that the cushion 130 for the seatback 110 can differ from the cushion 140 of the seat bottom 120. Likewise, it should be understood that the trim cover assembly 150 for the seat back 14 can differ from the trim cover assembly 150 for the seat bottom 120.

Referring again to FIG. 1, the foam cushions 130, 140 of seatback 110 and seat bottom 120 may define one or more recesses 135 in the foam cushions 130, 140, with the recess 135 being exposed to an external surface (not shown) of the foam cushions 130, 140. The recess 135 may provide access to a release handle bezel assembly 174 attached to the seat frame (not shown), and include a release handle 173, a housing 175 and a bezel 170. Although shown as a recess 135 in the foam cushion 130 of the seatback 110, the recess 135 may be any number of recesses and may be any suitable shape and depth and may be positioned in any suitable location on the foam cushions 130, 140 of the seat bottom 120 or the seatback 110, as based on the desired design of the seat assembly 100. For example, in the embodiment shown in FIG. 1, the recess 135 may be in the shoulder region of the seatback 110, whereas in the embodiment shown in FIGS. 2-8, the recess 135 may span from the shoulder of the seatback 110 towards the rear surface 114 of the seatback 110, as based on the desired design for the release handle 173 position for the seatback 110. The recess 135 may be for any suitable component, such as release handle bezel assembly 174 (e.g., a retractor or handle), that may require a bezel, such as a retractor bezel, seatbelt component, or other plastic feature, and may be sized and shaped according to the desired aesthetic design of such components, and the depiction of a release handle bezel assembly 174 is not intended to be limiting. Although the release handle bezel assembly 174 and the accompanying bezel 170, handle 173, and housing 175 are shown as singular components, each may comprise multiple pieces to form the release handle bezel assembly 174 and/or the bezel 70. As such, the release handle bezel assembly 174 and/or the bezel 170 may include one or more pieces which form a perimeter which corresponds to the recesses 135 in the cushion. Moreover, the perimeter may or may not be continuous, and may span multiple surfaces of the seatback 110. In FIG. 1, the perimeter of the recess 135 and the bezel 170 are within the shoulder region 111 of the seatback 110, and as shown in FIGS. 2-8, the corresponding peripheries of the release handle bezel assembly 174, the bezel 170, and the trim cover assembly 150 may extend from the shoulder region 111 of the seatback 110 to the rear surface 114 of the seatback 110, and as such, be continuous across different surfaces of the seat assembly 100.

Referring again to FIG. 1, the trim cover assembly 150 also includes a cover opening 153 defined in the trim cover 152, which corresponds to the respective recess 135 in the cushion 130 for accessing the release handle 173 of the release handle bezel assembly 174. In the embodiment shown in FIG. 1, the recess 135 and the cover opening 153 may have a corresponding size and shape to access the release handle 173 and to receive the bezel 170, however other components are also contemplated, and the depiction of the recess 135 being sized/shaped according to the singular component is not intended to be limiting.

Figure 2:
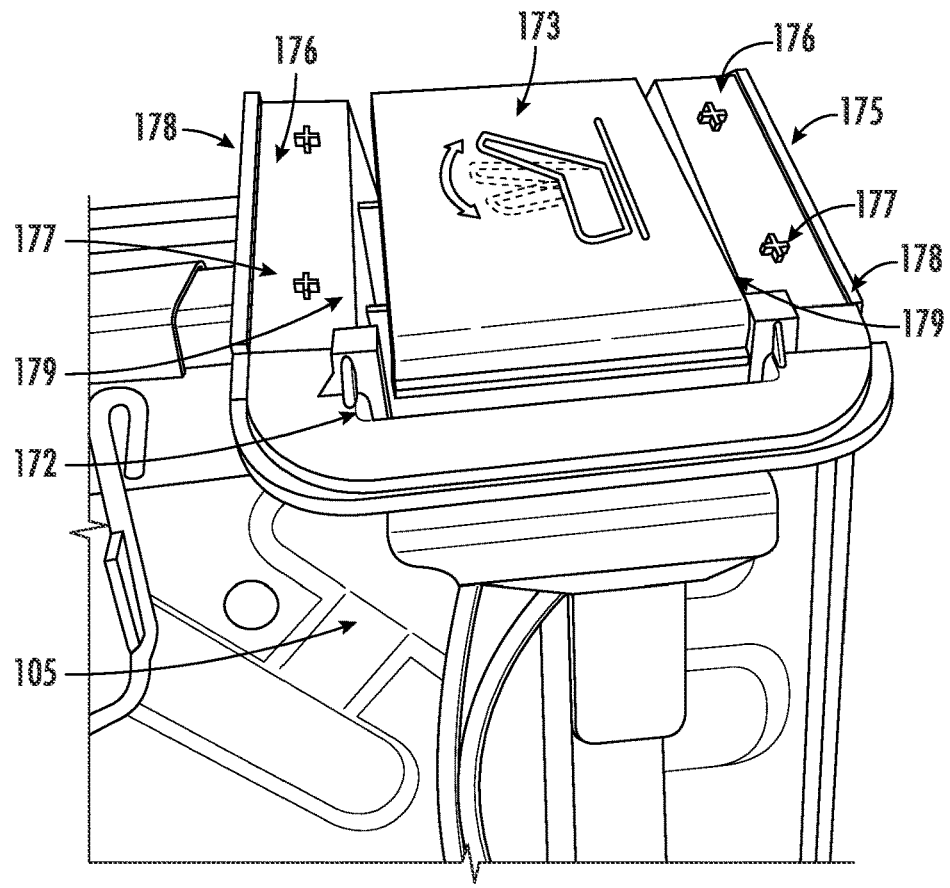
FIG. 2 is a perspective schematic illustration of a release handle bezel assembly, according to at least one embodiment.

Referring to FIG. 2, the release handle bezel assembly 174 is shown secured to a seat frame 105. The release handle bezel assembly 174 includes a handle 173 for adjusting the position of the seatback 110 with respect to the seat bottom 120, and a housing 175 surrounding the handle 173. The handle 173 and/or the housing 175 may be any suitable material, including, but not limited to, plastic or metal, as based on the desired design and look of the seat assembly 100. In embodiments where the seat assembly 100 is a second row seat (or other non-driver row seat), the handle 173 may engage a mechanism to fold from a sitting position into a loading position, where cargo can be loaded onto the rear surface 114 of the seatback 110 via the seatback 110 being folded onto the seat bottom 120. In certain embodiments, where the seat assembly 100 is a bench assembly, each portion or section of the seat assembly may include a corresponding release handle bezel assembly 174. For example, the seat assembly may be a 60/40 split, such that the seatback 110 actually spans a width of more than one seat, with each section including a release handle bezel assembly 174. In other embodiments, the seat assembly may be a 50/50 split (with two corresponding release handle bezel assemblies 174), an 40-20-40 split (thus having three separate release handle bezel assemblies).

Referring again to FIG. 2, the housing 175 has a portion extending towards the seat frame/into the seatback 110, and includes a body region 176 with one or more protrusions 177 extending upward from the body region 176 at the top end of the housing 175. The protrusions 177 may be positioned, sized, and shaped to serve as retainers for engaging the trim cover assembly 150, as will be discussed in further detail with respect to FIGS. 3-8. In one or more embodiments, the body region 176 includes one or more protrusions 177 per opposing side. For example, side 176a and side 176b of the body region 176 each includes two protrusions 177 spaced apart, and side 176c of the body region 176 does not include a protrusion 177. However, this is not intended to be limiting, and each side of the body region 176 may include protrusions 177 for engaging the trim cover assembly 150. In one or more embodiments, each opposing side may include 1 to 10 protrusions 177, in other embodiments, 1 to 7 protrusions, and in yet other embodiments, 1 to 5 protrusions. However, the number of protrusions 177 per side of body region 176 may be based on factors such as the dimension of the side, and thus, any suitable number of protrusions 177 may be used to engage the trim cover assembly 150. The protrusions 177 may be positioned at any suitable location on the body region 176, and each protrusion may be spaced from another protrusion by any suitable distance as based on the design of the housing 175 and the trim cover assembly 150. The protrusions 177 may have any suitable size or shape as based on the desired design of the housing 175. For example, the protrusions may have a T-shape or plus-sign shaped profile, or any other suitable shape for engagement with the trim cover assembly 150 (as will be discussed in further detail below). In certain embodiments, the protrusions 177 may be 0.25 mm to 2.5 mm tall, in yet other embodiments 0.3 mm to 2.25 mm tall, and in yet further embodiments 0.4 mm to 2 mm tall.

The housing 175 further includes a raised outer peripheral edge 178 defined at the outer periphery of the body region 176. The height of the peripheral edge 178 may be any suitable height, and may be about the same height as the protrusions 177, or in certain embodiments, be shorter than the height of the protrusions 177. Although shown as being a unitary piece with the body region 176, the raised outer peripheral edge 178 may be a separate component or components affixed to the body region 176, and the depiction of a unitary piece is not intended to be limiting.

Referring again to FIG. 2, the body region 176 also defines an inner periphery 179 of the housing 175 may be, in some embodiments, defined by the body region 176. In other embodiments (not shown), the inner periphery 179 may also include a raised edge, which may be the same height as the raised outer peripheral edge 178, shorter than the raised outer peripheral edge 178, or taller than the raised outer peripheral edge 178, as based on the desired aesthetics of the release handle bezel assembly 174. The inner periphery 179 defines an opening therein for receiving the handle 173. As shown in FIG. 2, in some embodiments, the housing 175 spans across multiple surfaces of the seatback, as shown by its curving portions with respect to the handle 173 (see FIG. 6B). In other embodiments, as will be discussed with reference to FIG. 5, the housing 175 may be generally planar and not curve towards other surfaces of the seatback. However, the design of the housing 175 is not intended to be limiting, and the housing 175 may be designed according to the aesthetic requirements of the seatback 110. As such, the inner periphery 179 as shown in FIG. 2, may have a generally U-shape when viewed from the top, as a section (not shown) of the body region 176 is positioned within another plane (e.g., along the rear surface 114), with the base of the U-shape including a widened base section 172 for receiving the pivoting mechanism for the handle 173.

Figure 3:
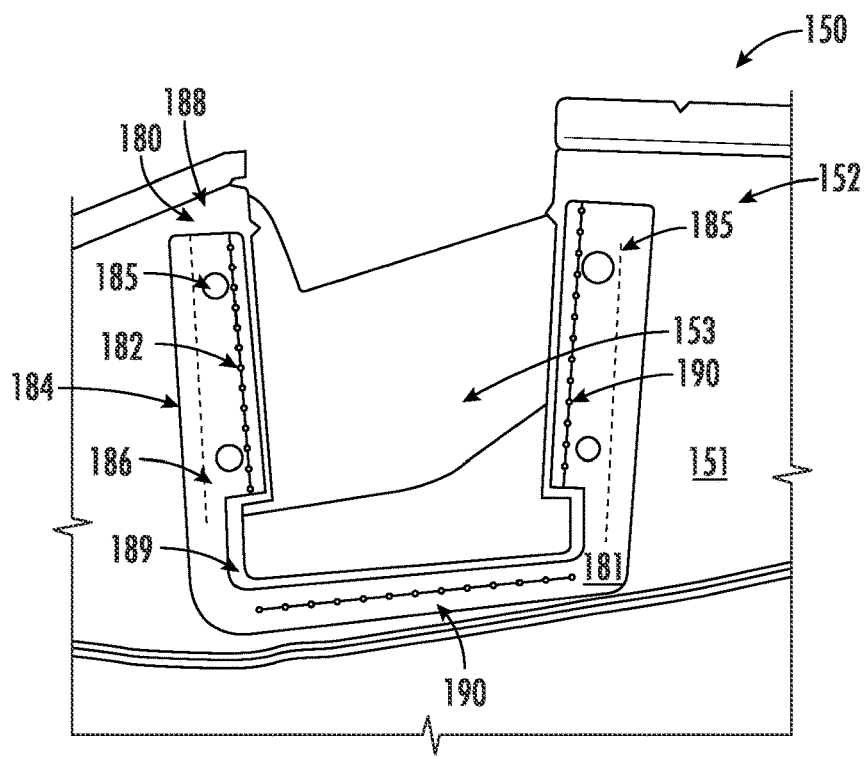
FIG. 3 is a schematic illustration of the B-side of a trim cover assembly, according to at least one embodiment.
Figure 6A:
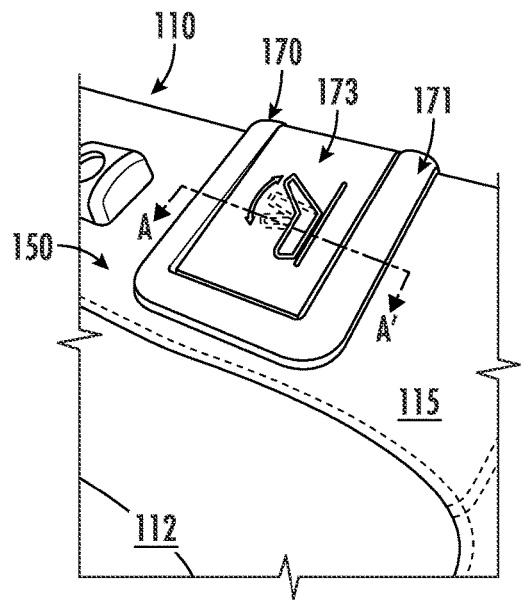
FIGS. 6A-B show perspective and rear views of the seat assembly of FIG. 5.
Figure 6B:
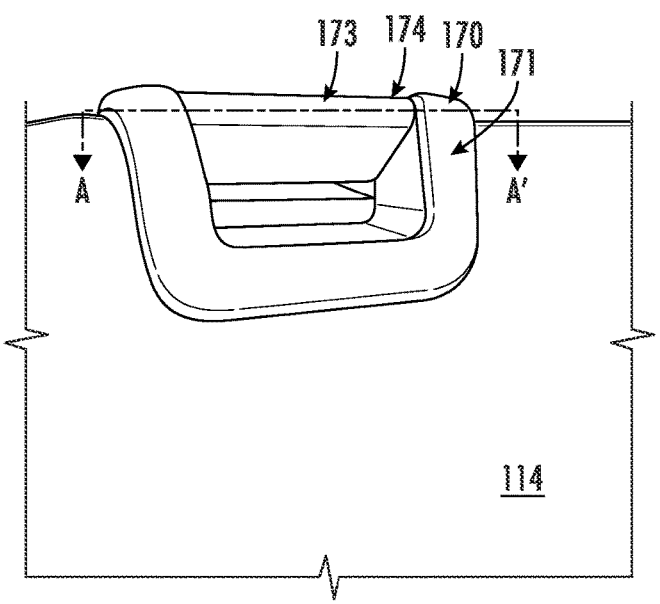

Referring to FIG. 3, a trim cover assembly 150 is shown, according to one or more embodiments. The trim cover assembly 150 includes a trim cover 152, and is shown from the B-side 151 of the trim cover 152. The B-side 151 of the trim cover 152 is the opposite surface of the trim cover 152 from the occupant surface 112 of the seatback 110. The B-side 151 of the trim cover 152 defines a cover opening 153 corresponding to the shape of the inner periphery 179 for accessing the handle 173 therethrough. As shown in FIG. 3, the cover opening 153 has a generally U-shape corresponding to the generally U-shape of the inner periphery 179 and has a widened base section 153a corresponding to the widened base section 172 of the inner periphery 179. The trim cover 152 may have a discontinuous edge 155 that corresponds to the housing 175, where the housing 175 curves to another surface of the seatback 110. Notably, the material of the trim cover 152 may change from surface to surface of the seatback 110, as shown in FIGS. 6A-B, and discussed above with respect to the trim material of the trim cover 152. As such, the material of the trim cover assembly 150 may have the discontinuous edge 155 corresponding to the border of the shoulder region 115 of the seatback 110 and the rear surface 114 of the seatback 110, with the discontinuous edge 155 having a gap 156 open to the cover opening 153 such that the cover opening 153 is not fully surrounded by trim material. The cover opening 153 is to be aligned with the handle 173 when the trim cover 152 is disposed on the housing 175 for attaching the trim cover assembly to the release handle bezel assembly 174 for the seat assembly 100.

Figure 5:
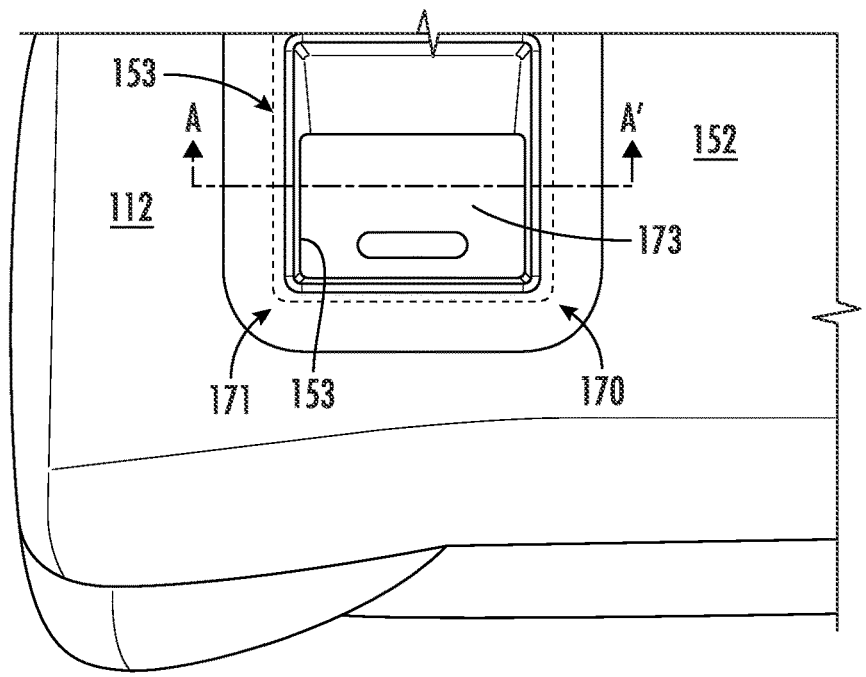
FIG. 5 is a top schematic illustration of a seat assembly, according to at least one embodiment.

Referring again to FIG. 3, the trim cover assembly 150 further includes a trim retention member 180, or, hereinafter, interchangeably, a trim retainer 180, secured to the B-side 151 of the trim cover 152, as shown from the rear side, according to an embodiment. Although shown as being stitched via stitching 190 to the trim cover 152, the trim retention member 180 may be secured to the B-side 151 of the trim cover 152 in any suitable manner, including, but not limited to, via an adhesive, welding, mechanical fasteners, stitching, and the like. Moreover, although shown as stitched via three continuous seams, the stitching need not be on every side of the trim retention member, nor need the seams be continuous. In some embodiments, the seam may be 2 to 4 mm in length. In certain examples, the trim retention member 180 may be stitched to at least one layer of the trim cover 152, and may not be visible from the A-side 112 of the trim cover 152. However, in other embodiments, the stitching 190 securing the trim retention member 180 to the trim cover 152 may be visible from the A-side 112, but positioned such that the bezel 170 (and bezel edge 171) hides the stitching 190 upon insertion of the bezel 170 into the seat assembly (as shown in FIGS. 5, 6A-B).

The trim retention member 180 has an A-surface (not shown), a B-surface 181, an inner periphery 182, and an outer periphery 184, with a body 186 therebetween. The inner periphery 182 defines a retainer opening 188, which generally corresponds to at least a portion of the cover opening 153 for providing access to the handle 173. The trim retainer 180 is sized and shaped to correspond with the body region 176 of the housing 175, to be received on the body region 176 when the trim cover 152 is to be secured. In the embodiment shown in FIG. 3, the body 186 of the trim retention member 180 is sized such that the inner periphery 182 forms the retainer opening 188 dimensionally larger than the cover opening 153, but generally sized such that the inner periphery 182 forms an edge defining the cover opening 153 such that the trim retention member 180 can be received within the housing 175 upon installation of the trim cover assembly 150, while still providing access to the handle 173.

The trim retention member 180 is shown as having a generally U-shaped profile (and with widened portion 189), with the retainer opening 188 having a generally U-shaped profile, however this is not intended to be limiting, and the trim retention member 180 and/or the retainer opening 188 may have a shape as based on the desired design of the seat, the shape of the handle 173, the shape of the release handle bezel assembly 174 and/or the cover opening 153. In the embodiment shown, the trim retention member 180 is generally U-shaped based on the housing 175 extending from the shoulder region 115 to the rear surface 114 of the seatback, and may have a continuous inner periphery 182 in embodiments where the housing 175 is on a single region of the seatback 110. Moreover, the trim retention member 180 need only cover a portion of the area surrounding the cover opening 153 (e.g., one or more sides of the cover opening 153).

The body 186 of the trim retainer 180 includes one or more apertures 185 corresponding to the protrusions 177 of the housing 175, and sized to receive the top of the protrusion 177 therein in a mechanical fit manner. Although shown as extending through the entire thickness of the trim retention member 180, the apertures 185 may be any suitable depth to engage the protrusions 177, and depiction of an aperture is not intended to be limiting, and wells in the trim retention member 180 are also contemplated. The apertures 185 may be aligned with the protrusions 177 such that the trim cover 152 can be secured on the housing 175, as will be discussed in further detail with reference to FIG. 7. The profile shape of the protrusion 177 and the shape of the aperture 185 need not be similar, and may generally be shaped to correspond such that the apertures can receive the protrusion therein to improve retention of the trim cover 152 on the housing 175. Generally, the trim retention member 180 may be sized according to the corresponding cover opening 153 and the housing 175 to provide structural support to the trim cover 152 when the trim cover assembly 150 is installed on the seat assembly 100. The dimensions of the trim retention member 180 may be designed to have any suitable size as based on the retention on the body region 176 of the housing 175. In one or more embodiments, the trim retention member 180 may have thickness of 0.5 mm to 3 mm, in other embodiments, 0.75 mm to 2.5 mm, and in yet other embodiments, 1 mm to 2 mm. In certain embodiments the trim retention member 180 has a thickness of 1.5 mm. In certain embodiments (not shown), the protrusions and the apertures may be reversed such that the trim retention member 180 includes protrusions extending downward from the B-surface 181 toward the housing 175, and the housing 175 includes apertures therein to receive the protrusions from the trim retention member 180. In certain other embodiments, each component (i.e., the housing 175 and the trim retention member 180) may each include a combination of protrusions and apertures such that the protrusions and apertures of one component align with the apertures and the protrusions of the other component, respectively.

In one or more embodiments, the trim retention member 180 may be any suitable material to provide structural support to the cover opening 153, including, but not limited to leather, fabric, or polypropylene. The material of the trim retention member 180 generally has sufficient rigidity to maintain support the trim cover 152 on the housing 175 and engage with the protrusions 177 to better secure the trim cover 152 to the housing 175. For example, the trim retention member 180 may be made of polypropylene. Moreover, in certain embodiments, the material of the trim retention member 180 may be configured to receive stitching therethrough upon application of a seam through the trim retention member 180 and into the trim cover 152 to secure the trim retention member to the B-side 151 of the trim cover 152. In other embodiments, the material of the trim retention member 180 may be selected such that the trim retention member 180 can be secured to the trim cover 152 via an adhesive, stitching, welding, or by mechanical fastener(s), as previously discussed. As such, the trim retention member 180 may be, in certain embodiments, a woven or non-woven material of sufficient rigidity to provide structural support to the trim cover assembly 150 and reduce wrinkling of the trim cover 152 near the release handle bezel assembly 174. In certain embodiments, where the trim retention member 180 is secured to the trim cover 152 via stitching 190, the seams may be any suitable length for securing the trim retention member 180 to the trim cover 152, including in some embodiments, 1 to 10 mm along the body 186, in other embodiments 2 to 8 mm, and in yet other embodiments 3 to 7 mm. In at least one embodiment, the seams may be up to 5 mm along the body 186, and run generally perpendicular to the width of the body 186 of the trim retention member 180.

Figure 4:
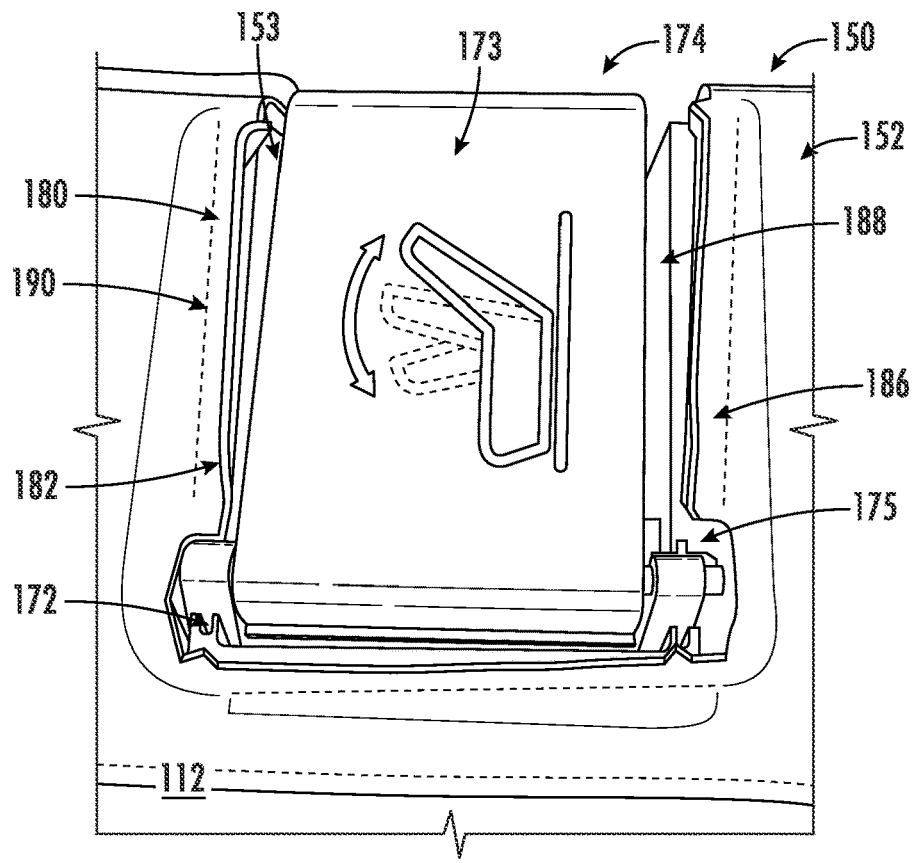
FIG. 4 is a top schematic illustration of a release handle bezel assembly of FIG. 2 with the trim cover assembly of FIG. 3 disposed thereon, according to an embodiment.

Referring to FIG. 4, the trim cover assembly 150 is shown disposed on the housing 175 of the release handle bezel assembly 174. The trim cover assembly 150 is aligned such that the trim retention member 180 engages with the protrusions 177 of the housing 175, and rests thereon. The trim retention member 180 sits inward (toward the handle 173) of the outer peripheral edge 178 of the housing 175, with the trim cover 152 extending over the outer peripheral edge 178 and away from the handle 173 in a covering relationship. Thus, the trim cover 152 is held in position around the handle 173 for receiving the bezel 170 thereon. In the embodiment of FIG. 5, the trim retention member 180 is secured in a manner to the trim cover 152 such that the fastening mechanism is not shown on the A-side 112 of the trim cover 152, whereas stitching 190 is visible on the A-side 112 before receiving the bezel 170 in the embodiment of FIG. 4, and covered by the bezel 170 upon insertion (see FIG. 7). As shown in FIG. 4, the occupant support surface 112 shows the trim cover assembly 150 secured to the cushions 130, 140 such that the recess 135 is exposed for the handle 173 to be accessible via the cover opening 153. The trim cover assembly 150 is disposed on the housing 175 such that the protrusions 177 and the apertures 185 are aligned and engage (as will be discussed with reference to FIG. 7). As such, the trim retention member 180 better secures the cover opening 153 around the handle 173 and avoids the appearance of wrinkles in visible surface of the trim cover 152 around the release handle bezel assembly 174.

Referring to FIGS. 5 and 6A-B, the bezel 170 is shown disposed over the trim cover assembly 150 and on the housing 175 to form the seat assembly 100, such that the trim cover assembly 150 is pinched between the bezel 170 and the housing 175 of the release handle bezel assembly 174. Although shown as single pieces for release handle bezel assembly 174, each component of the release handle bezel assembly 174 may comprise one or more components. For example, the bezel 170 may comprise one or more pieces to define a perimeter that corresponds to the shape of the handle 173 (and corresponds to the cover opening 153). More particularly, the bezel 170 may be shaped to span multiple surfaces of the seatback 110. The bezel has peripheral flanges or peripheral edges that extend outward from a bezel body to form edges 171 of the bezel 170 that lay on the occupant support surface 112 of the trim cover 152 to pinch the trim cover assembly 150 between the edge 171 and the housing 175. The trim retention member 180 secures the trim cover 152 in position on the housing 175 such that the insertion of the bezel 170 can sandwich the trim cover 152 without causing wrinkling due to, for example, movement of the trim cover 152 on the housing 175. As previously discussed, the trim retention member 180 may be sized and shaped according to the profile of the bezel 170 and/or the handle 173 such that the trim cover 152 has the cover opening 153 sized and disposed on the housing 175 without wrinkles and with support to hold the bezel 170 thereon. Furthermore, the securement of the trim cover assembly 150 and the housing 175 removes the need for an additional part as a fixing point for the trim at the recess 135, and incorporates the trim retention member 180 as part of the trim cover assembly 150.

Figure 7:
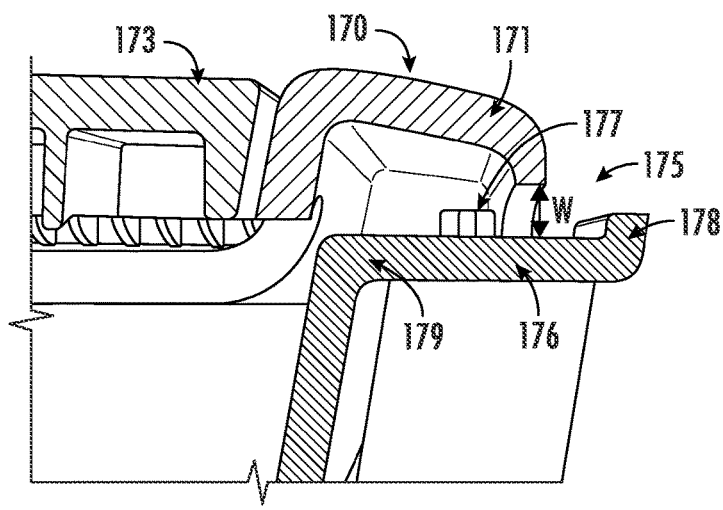
FIG. 7 is a partial cross-sectional view of the seat assembly, taken along A-A'.

Referring to FIG. 7, a cross-sectional view of the release handle bezel assembly 174 and the bezel 170 is shown positioned together, with the trim cover assembly 150 omitted to better show the protrusions 177, according to an embodiment. The edges 171 of the bezel 170 and the body region 176 of the housing 175 form a window W for sandwiching the trim cover assembly 150 therebetween (not shown) such that the trim cover retention member 180 engages the protrusions 177. As can be seen in FIG. 7, the edge 171 of the bezel 170 rests between the protrusions 177 and the raised outer peripheral edge 178, such that the edge 171 pinches the trim cover assembly 150 therebetween. Thus, in embodiments where the stitching or seam reaches the A-side of the trim cover 152, the stitching may be located such that the edge 171 of the bezel 170 hides the seam thereunder (as shown in FIG. 5).

According to another embodiment of the present disclosure, a method of assembling a seat with a trim cover assembly having a trim retention member is provided. The method includes cutting a pattern in a trim cover to form a cover opening through the trim cover. Furthermore, the method includes securing the trim retention member on a B-side of the trim cover to at least one layer of the trim cover to form a trim cover assembly, the trim retention member defining a retainer opening therethrough corresponding to the cover opening, and positioning the trim cover assembly on a handle housing. At least one of the handle housing and the trim retention member include one or more protrusions extending toward the other of the handle housing and the trim retention member, with the other of the handle housing and the trim retention member defining one or more apertures corresponding to the protrusions through at least a portion of the thickness of the handle housing or the trim retention member. The securing of the trim retention member to the trim cover may be by stitching, via an adhesive, by welding, or via mechanical fasteners, and the positioning may include aligning and engaging the protrusions with the apertures. The method further includes placing a bezel on the trim cover assembly such that the trim cover assembly is sandwiched between the bezel and the handle housing. The edge of the bezel contacts an A-side of the trim cover, opposite the B-side.

According to one or more embodiments, a trim cover assembly includes a trim cover defining a cover opening for accessing a handle therethrough when the trim cover assembly is covering a seat. The trim cover assembly also includes a trim retention member on the B-side of the trim cover with a retention opening positioned according to the cover opening. The trim cover assembly is configured to be disposed on a housing of a release handle bezel assembly, with the trim retention member engaging fastening elements on the housing. One of the trim retention member and the housing include protrusions, and the other apertures, or each includes a combination of apertures and protrusions, which engage to secure the trim cover assembly on the housing. The bezel is then placed thereon to sandwich the trim cover assembly between the housing and the bezel, with the trim retention member improving the finish and closeout appearance of the trim cover around the release handle bezel assembly.

Except in any examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. As used herein, the term "about" means that the amount or value in question may be the specific value designated or some other value in its neighborhood. The term "about" or "generally" denoting a certain value is intended to denote a range within +/−5% of the value. As one example, the phrase "about 100" denotes a range of 100+/−5, i.e. the range from 95 to 105. When the term "about" or "generally" is used, it can be expected that similar results or effects according to the invention can be obtained within a range of +/−5% of the indicated value. It should also be appreciated that integer ranges (e.g., for measurements or dimensions) explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended aspects, the singular form "a," "an," and "the" comprise plural referents unless the context clearly indicates otherwise. For example, reference to a component in the singular is intended to comprise a plurality of components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a seat cushion having an external surface and defining a recess therein;
    a release handle bezel assembly including a handle housing positioned within the recess and including a body region, a release handle associated with the handle housing, and a bezel having a peripheral edge; and
    a trim cover assembly disposed over the seat cushion and handle housing such that a portion of the trim cover assembly is sandwiched between the peripheral edge of the bezel and the body region of the handle housing, the trim cover assembly providing access therethrough to the release handle, the trim cover assembly including:
       a trim cover having an A-side as an occupant surface and a B-side, opposite the A-side, facing the external surface of the seat cushion, with the trim cover defining a cover opening therethrough generally corresponding to the release handle; and
       a trim retainer secured to the B-side of the trim cover, the trim retainer having an inner periphery defining a retainer opening generally corresponding to at least a portion of the cover opening;
    wherein at least one of the body region of the handle housing and the trim retainer include one or more protrusions cooperable with one or more apertures in the other of the at least one of the body region and the trim retainer such that the trim cover assembly can be held on the handle housing between the bezel and the handle housing.

2. The seat assembly of claim 1, wherein the one or more protrusions are located extending upwardly from the body region of the handle housing towards the bezel.

3. The seat assembly of claim 2, wherein the peripheral edge of the bezel is positioned between the protrusion and a raised outer peripheral edge of the handle housing.

4. The seat assembly of claim 1, wherein the trim retainer is a polypropylene plate.

5. The seat assembly of claim 1, wherein the trim retainer is secured to at least one layer of the trim cover on the B-side via stitching.

6. The seat assembly of claim 1, wherein the trim retainer is 0.5 mm to 3 mm thick.

7. The seat assembly of claim 1, wherein the trim retainer includes apertures therethrough, and the apertures span the thickness of the trim retainer such that the B-side of the trim cover is visible therethrough.

8. A trim cover assembly comprising:
    a trim cover disposable over a seat cushion having a release handle bezel assembly, the trim cover having an A-side and a B-side, opposite the A-side, facing an external surface of the seat cushion, with the trim cover defining a cover opening that, when disposed over the seat cushion, generally corresponds to a release handle of the release handle bezel assembly; and
    a trim retainer secured on the B-side of the trim cover, the trim retainer having an inner periphery defining a retainer opening generally corresponding to at least a portion of the cover opening,
    wherein the trim retainer engages a housing of the release handle bezel assembly such that the trim cover assembly can be secured to the housing and between the housing and a bezel of the release handle bezel assembly.

9. The trim cover assembly of claim 8, wherein the trim retainer has a generally U-shape.

10. The trim cover assembly of claim 8, wherein the trim retainer includes one or more apertures for engaging the housing.

11. The trim cover assembly of claim 10, wherein the one or more apertures are sized to engage protrusions on the housing.

12. The trim cover assembly of claim 8, wherein the trim retainer is secured to at least one layer of the trim cover on the B-side.

13. The trim cover assembly of claim 8, wherein the trim retainer is secured to at least one layer of the trim cover on the B-side by stitching.

14. A method comprising:
    providing a trim cover having a cover opening through the trim cover for accessing a release handle;
    securing a trim retainer on a B-side of the trim cover, the trim retainer defining a retainer opening and generally corresponding to at least a portion of the cover opening to form a trim cover assembly;
    disposing the trim cover assembly over a handle housing of a release handle bezel assembly by engaging the trim retainer to the handle housing via at least one of the trim retainer and the handle housing including one or more protrusions and the other including one or more apertures generally corresponding to the one or more protrusions; and
    placing a bezel on the trim cover assembly to sandwich the trim cover assembly between the handle housing and the bezel.

15. The method of claim 14, wherein securing the trim retainer includes stitching the trim retainer to at least one layer of the trim cover on the B-side.

16. The method of claim 14, wherein the handle housing includes a raised outer peripheral edge, and placing the bezel includes placing an outer edge of the bezel between a protrusion or aperture and the raised outer peripheral edge.

17. The method of claim 14, wherein the trim retainer is 0.5 mm to 2 mm thick.

18. The method of claim 14, wherein the trim retainer is polypropylene.

19. The method of claim 14, wherein the trim retainer includes one or more apertures for engaging the housing.

20. The method of claim 19, wherein the one or more apertures are sized to engage protrusions on the housing.

* * * * *